(No Model.) 2 Sheets—Sheet 1.

M. COOPER.
DUMPING DEVICE.

No. 245,707. Patented Aug. 16, 1881.

Witnesses
F. L. Ourand
G. W. Chase

Inventor
M. Cooper
By John S. Duffie
Attorney (No Model.) 2 Sheets—Sheet 2.

M. COOPER.
DUMPING DEVICE.

No. 245,707. Patented Aug. 16, 1881.

Witnesses
F. L. Ourand
G. W. Chase

Inventor
M. Cooper
By J. S. Duffie
Attorney

UNITED STATES PATENT OFFICE.

MONTRAVILLE COOPER, OF COLUMBIA, SOUTH CAROLINA.

DUMPING DEVICE.

SPECIFICATION forming part of Letters Patent No. 245,707, dated August 16, 1881.

Application filed May 18, 1881. (No model.)

*To all whom it may concern:*

Be it known that I, MONTRAVILLE COOPER, a citizen of the United States, residing at Columbia, in the county of Richland and State of South Carolina, have invented certain new and useful Improvements in Dumping Devices; and I do hereby declare the following to be a full, clear, and exact description of the invention, such as will enable others skilled in the art to which it appertains to make and use the same, reference being had to the accompanying drawings, and to the letters or figures of reference marked thereon, which form a part of this specification.

My invention relates to dumping devices; and it consists of a dumping-barrow and frame-work. The barrow is mounted on two wheels and two oscillating arms secured in the frame-work. The two oscillating arms are securely pivoted to the barrow and to the frame-work, the barrow having two handles, an automatic gate, lever, and flange for securing the gate when closed, all so arranged that the same may be operated by hand-power, all of which is hereinafter more fully described.

Figure 1:
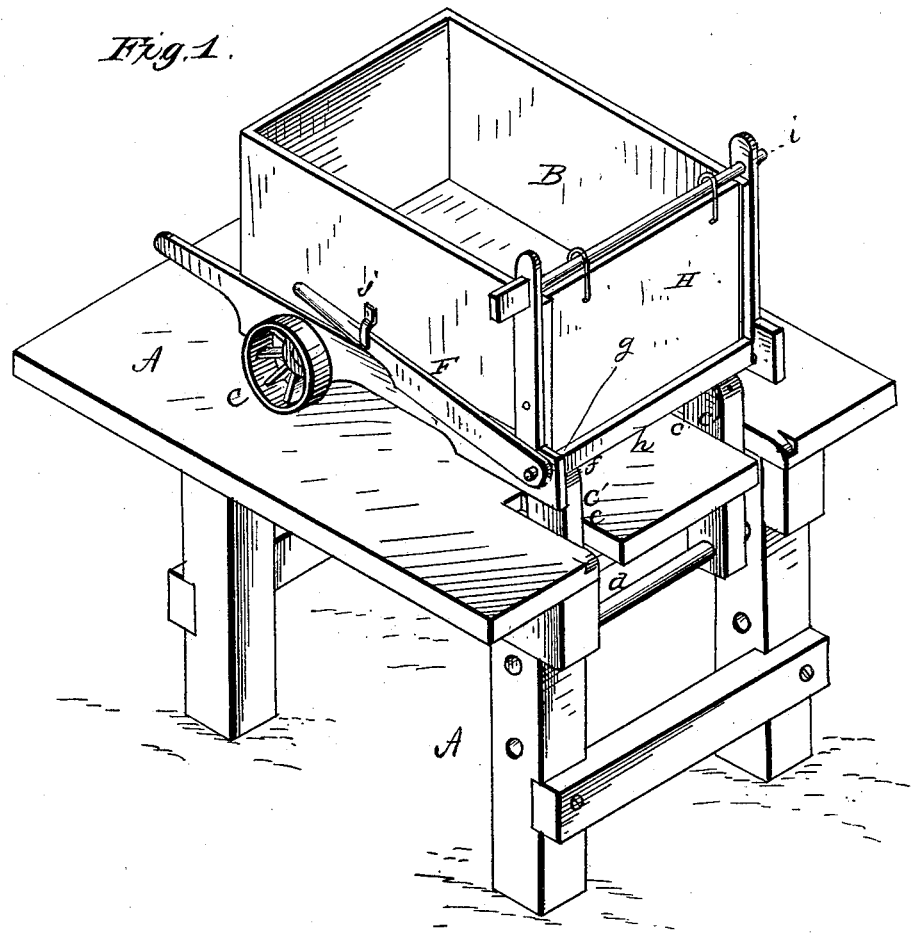
Figure 2:
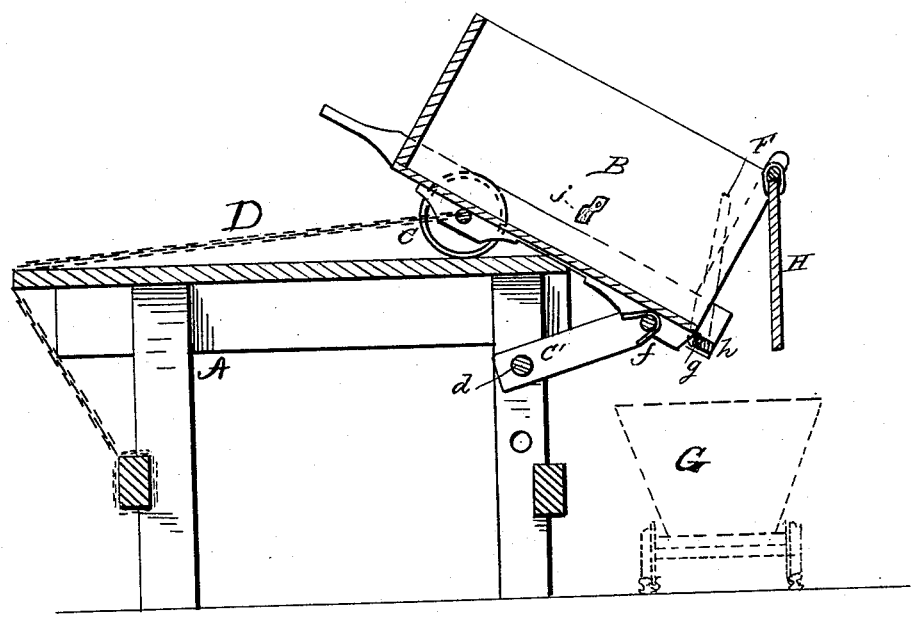
Figure 3:
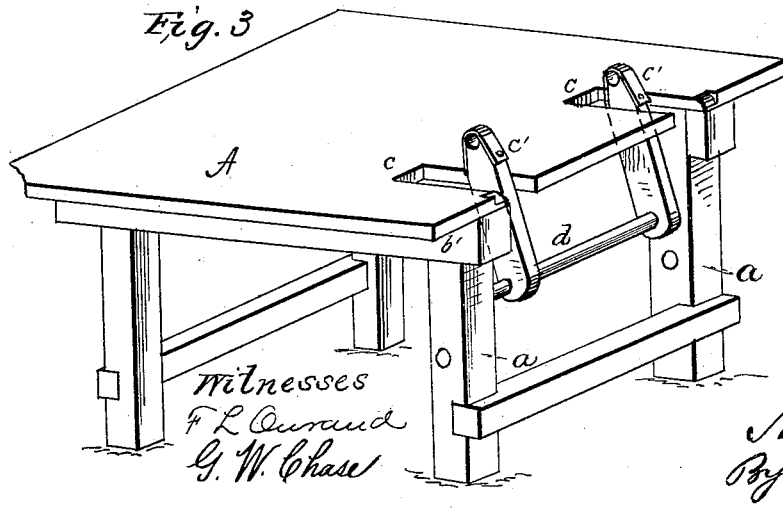

Figure 1 represents a perspective view of the frame-work covered with a floor, with the barrow mounted thereon, all of sufficient size and strength for the purposes intended. Fig. 2 represents a side view of my dumping device as the barrow hangs over front side of the frame-work discharging its contents into the engine's tender below. Fig. 3 is a more detailed view of the frame-work, the more fully to illustrate the combination of oscillating arms $c'$ $c'$, rod $d$, and frame-work A.

Having given a general description of my dumping device, I shall now proceed to describe each part thereof and its function, and in so doing I shall first make reference to Fig. 3.

In Fig. 3, A represents the frame-work covered with a floor; $a$ $a$, posts, into which rod $d$ is secured. $c'$ $c'$ represent oscillating arms having holes at either end, and are pivoted on rod $d$; and $c$ $c$ represent recesses cut into the front side of the floor on frame-work A, to allow said oscillating arms to play up and down as guides for the same.

In Fig. 1, A represents the frame-work and floor with the barrow B upon the same, mounted on wheels $e$ and oscillating arms $c'$ $c'$. The barrow is securely pivoted to oscillating arms $c'$ $c'$ by means of rod $f$, which passes through the front ends of the frame-work of the barrow and the holes in the upper ends of arms $c'$ $c'$. (See Fig. 2.) H represents a loose gate in the front end of barrow B, hinged on rod $i$. $h$ represents a rod having a flange, $g$. This rod is passed through the front post of frame-work of barrow B, and on the end of the same is rigidly secured lever F, sufficiently long to be reached by the operator while standing at the handles of the barrow. This rod and flange is used for keeping the gate H from flying open after it has been closed, by bringing the lever F down and securing it under cleat $j$, which motion turns flange $g$ up against the outside and lower end of gate H.

In Fig. 2, A represents a side elevation of the frame-work; B, the barrow; D, the cable or chain, which is securely fastened to the rear end of barrow B and to the back or rear side of frame-work A, and the office of this cable is to prevent the barrow from riding too far over the front side of the frame-work A when discharging its contents into the tender G. I do not confine myself to the cable, but claim the right to use any suitable means for this purpose.

My dumping device is operated as follows: The barrow, when properly mounted on the frame-work and the gate secured as seen in Fig. 1, is loaded and stands awaiting the arrival of the cars. When the train arrives the engine's tender is stopped opposite the dumping device, the barrow is run over the front side of the frame-work riding on arms $c'$ $c'$ and wheels $e$ $e$, the lever F is let loose from under cleat $j$, when gate H automatically swings open and allows the barrow to discharge its contents into the tender below. Then the barrow is withdrawn to its original position, and the train allowed to pass on without delay.

Having thus described my invention, what I claim as new, and desire to secure by Letters Patent, is—

1. In a dumping device, the combination, with the barrow B, having the rod $i$ at its upper front portion, of the gate H, hinged to said rod, and rod $h$, having flange $g$ and lever F, for operating said gate, substantially as shown and described.

2. The combination of dumping-barrow B, having swinging gate H, rod $h$, flange $g$, lever F, and cleat $j$, with oscillating arms $c'$ $c'$ and frame-work A, substantially as described, and for the purposes set forth.

3. In a dumping device, the combination, with the posts $a$ $a$, the platform A, having guideways $c$ $c$ formed therein, of the oscillating arms $c'$ $c'$, pivoted to rod $d$ at their lower ends, and adapted to be secured at their upper ends to the front end of barrow B, substantially as described.

In testimony whereof I affix my signature in presence of two witnesses.

MONTRAVILLE COOPER.

Witnesses:
 J. H. VON HASSELN,
 J. J. FRITNELL.